Oct. 27, 1959     A. FRÖHLICH     2,910,110
CLAMPING DEVICE

Filed March 1, 1956     2 Sheets-Sheet 1

INVENTOR
ADOLF FRÖHLICH
BY
ATTORNEY

Oct. 27, 1959   A. FRÖHLICH   2,910,110
CLAMPING DEVICE
Filed March 1, 1956   2 Sheets-Sheet 2

INVENTOR
ADOLF FRÖHLICH
BY
ATTORNEY

United States Patent Office 2,910,110
Patented Oct. 27, 1959

2,910,110

CLAMPING DEVICE

Adolf Frohlich, Akron, Ohio, assignor to The Cleveland Trust Company, Cleveland, Ohio, as trustee Application March 1, 1956, Serial No. 568,753

4 Claims. (Cl. 154—9)

This invention relates to the manufacture of pneumatic tires, and in particular relates to improvements in machinery for building pneumatic tires in the "green" or uncured state.

While the big majority of pneumatic tires are presently built in a flat cylindrical form as the result of the application of fabric plies about a similarly shaped drum, recent improvements have been directed towards the use of a tire machine that builds an uncured tire in toroidal configuration. A representative machine of this improved type is illustrated and set forth in detail in U.S. Patent 2,503,815, issued on April 11, 1950, to Adolf Frohlich. In this patent, two series of gripping arms, each arranged in a circular course on opposite sides of the building form, grip the opposed edges of the fabric ply and then move the same through a retracting curvilinear path, so that the fabric ply is applied to a toroidal shaped building form and assumes the contour thereof.

Each set or series of gripping arms is in reality, defined by outer and inner gripping bands which move between open and closed positions as shown in the patent. The inner gripping band is mounted on the projecting or inboard end of the curving arm, while the outer band is in each case, mounted upon stud fingers that project from individual gripping elements. It is with respect to the improved type of mounting of the outermost bands and the construction of these gripping elements, that this invention has particular reference.

It is accordingly a principal object of this invention to provide a mounting means for concentrically suspending a resilient band about a plurality of radially extending clamping members that are disposed in a circular course about a common axis.

It is a further object of this invention to provide supporting means of the character above described that will additionally function to aid in applying the fabric ply to the building core of a machine of the character described.

It is a still further object of this invention to provide an improved type of gripping element for machines of the character above described that is characterized by the presence of means for effectuating a wrinkle-free application of fabric plies about the bead portion of a building core.

These and other objects of the invention will become more apparent upon a reading of the following brief specification, considered and interpreted in the light of the accompanying drawings.

Figure 1:
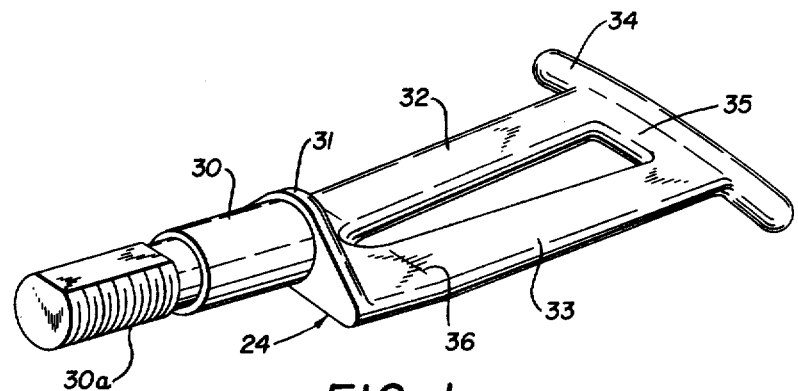
Figure 1 is a perspective view illustrating the improved mounting finger that carries the resilient bands.
Figure 2:
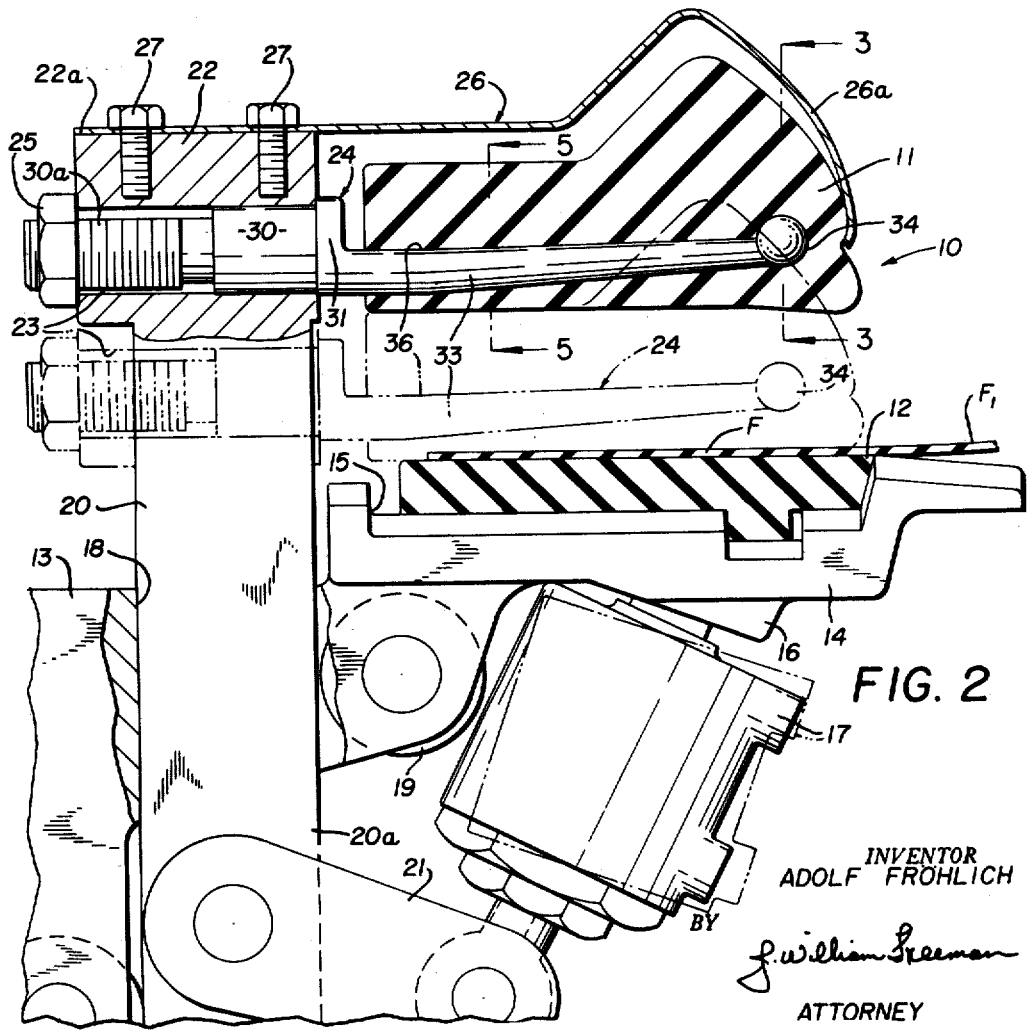
Figure 2 is a sectional view partly broken away and in section and illustrating in full and chain-dotted lines the various positions of the component parts.

Referring now to the drawings and in particular to Figures 1 and 2 thereof, the improved clamping mechanism, generally designated by the numeral 10, is shown as including outer and inner clamping members that are respectively arranged in concentric circular courses so that upon movement from full to the chain-dotted line position of Figure 2, fabric ply F may be gripped between the outer and inner resilient bands 11 and 12, respectively.

For this purpose, the inner clamping mechanism is defined as a plurality of elongated arms 13, 13, each having their inboard end 14 undercut as at 15 for reception therein of the inner band 12 as best shown in Figure 2. Additionally, an abutment 16 is provided on each inboard end 14 for attachment in known manner, to the free end of a piston 17, while a vertical slot 18 (Figure 2) as well as rollers 19, 19 are provided on each arm 13 for coaction with the outer clamping mechanism 11 as will now be described.

To this end, the outer clamping mechanism includes a plurality of elongate shank members 20, 20 that are received in slot 18 for coaction with rollers 19, 19. In this manner, the individual shank members 20, 20 are disposed radially of the axis of the machine (not shown) and radial movement thereof is provided for by the use of link members 21, 21 that respectively interconnect the lower end 20a (see Figure 2) of each shank 20 with the piston 17. The opposed end of each shank 20 is shown defined by an enlarged head 22 that is apertured in each case as at 23, to receive a projecting finger support 24; the arrangement being such that the entire circular course of finger supports 24, 24 serves to suspend the outer clamping band 11 in radially spaced relationship with respect to the inner band 12 when the parts are in the full line position of Figure 2.

Figure 3:
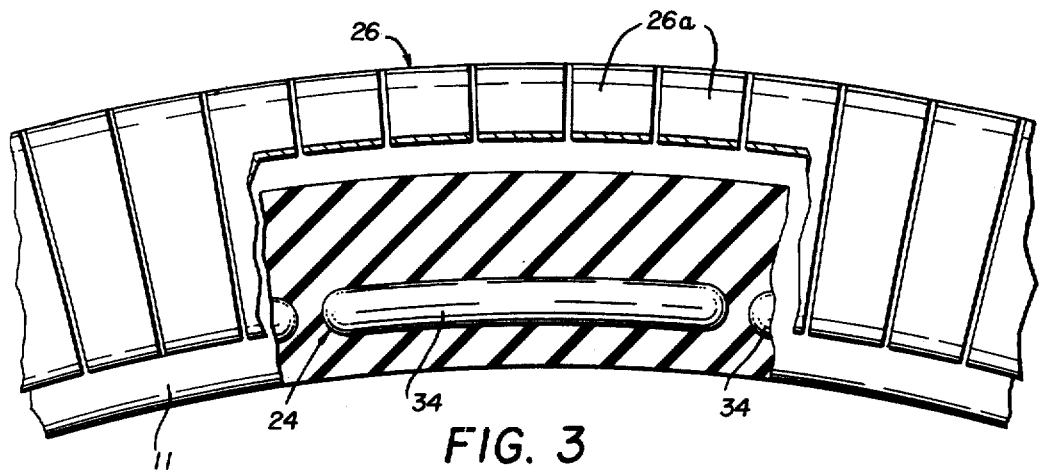
Figures 3 and 4 are sectional views taken on the lines 3—3 of Figure 2, and showing the position of the component parts in full and chain-dotted lines, respectively.
Figure 4:
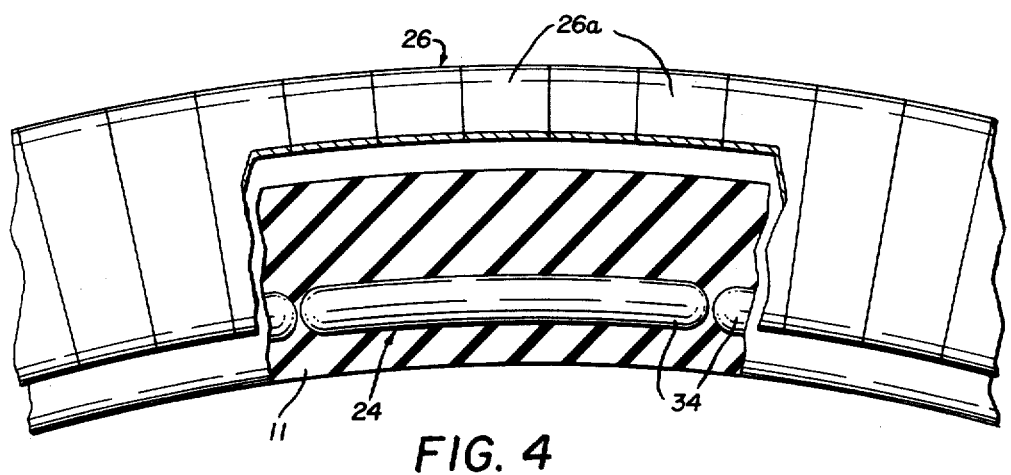
Figure 5:
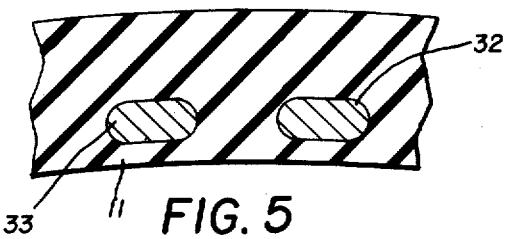
Figure 5 is a view taken on the lines 5—5 of Figure 2.

While the individual finger supports 24, 24 may be secured to the enlarged heads 22, 22 by the use of bolts 25, 25 in known manner, each top surface 22a of head 22 serves as a seat for a flat sheet of spring steel that is generally indicated as 26, and which is secured to each head by bolts 27, 27 for example. The contour of each individual spring 26 is shown approximating at its outer end, the cross-sectional outlined configuration of the outer band 11, with an arcuate section 26a serving as a wiping surface for smoothing out wrinkles in the fabric being applied about the usual building core provided in machinery of this type. It is to be noted from Figure 3 that the arcuate width of each spring 26 is such that the same will be slightly spaced with respect to each other when in the open position of Figure 2. However, as the position of Figure 4, representing the position of the component parts in the chain-dotted line position of Figure 2, is reached, the individual springs 26, 26 will be abutted against each other to form a solid surface.

Turning now to Figure 1 for a description of the individual finger supports 24, it will be seen that each of the same includes a shank end 30 that has one axial end thereof defining a screw thread 30a that may coact with the bolts 25, 25 as shown in Figure 2. The opposed axial end of the shank portion 30 is defined by a triangular-shaped flange, with such flange 31 serving as a base for a pair of arm members 32 and 33 that project from the flange 31 in substantially axial alignment with the axis of the shank member 30. The individual arms 32 and 33 that have been just described are shown connected at their outer ends by an arcuate segment 34 of circular cross-section, with a reinforcing portion 35 being supplied in this area for giving additional strength. It is also to be noted from examination of Figure 2 of the drawings, that the individual arms 32 and 33 may be slightly bent along the line 36 so as to in effect cause the outer ends of the arms 32 and 33 to be upturned with respect to the axis of the shank member 30.

In use or operation of the improved clamping mechanism 10, it will be first assumed that the component parts have been assembled in the position of Figure 2, with the inner band 12 being mounted in the undercut 15, while the outer band 11 has been molded or otherwise formed on the finger supports 24, 24, with these finger supports being installed in shanks 20, 20 prior to operation.

At this point, the machine may be operated so that the overall clamping mechanism 10 is moved axially until the edge portions of fabric F overlie the inner clamping band 12. At this time the piston 17 may be operated to move the outer band 11, together with finger supports 24 and shank member 20 to the chain-dotted line position of Figure 2, at which time the fabric F will be firmly clamped between the outer and inner bands 11 and 12 respectively. With the fabric F thus gripped, the clamping mechanism 10 may be moved through a retracting curvilinear path of movement to apply the fabric ply F about the building core (not shown). During such movement, it is apparent that the outer clamping band 11 will be firmly fixed with respect to the individual finger supports 24, 24; and in this regard it is to be noted that the provision of a rubber band in the space between the arms 32 and 33 prevents radial displacement of the band with respect to the individual finger supports 24, 24. In this manner, any shifting or other moving of the band 11 is obviated during the actual application of the fabric ply F.

It will also be noted that the outer arcuate segments 34, 34, when the parts are in the clamped position as shown in chain-dotted lines in Figure 2, will be spaced so as to be abutting each other at their arcuate ends, as clearly shown in Figure 4 of the drawings. In this manner, a solid steel ring is provided to clamp the fabric between the outer and inner clamping members.

It will also be noted that during the retracting curvilinear movement, the fabric ply F will be turned up so that the top surface $F_1$ (see Figure 2) will eventually be engaged by the arcuate sections 26a, 26a of the respective springs 26, 26; with the result that any wrinkles or other surface imperfections in the fabric at this area will be smoothed or ironed out by the spring members 26, 26 which are in the abutted condition with respect to each other as shown in Figure 4 of the drawings.

It will be seen from the foregoing that there has been provided a new and novel approach to the problem of applying ply about a toroidal shaped building form. It has been shown how during the periods of radial contraction the resilient bands are prevented from shifting arcuately as a result of the opening provided centrally of the individual fingers 24, 24. It has been further shown how the use of an arcuate end segment forms a solid steel ring which can be used to exert extreme axial pressure upon the tire being built.

Additionally, it is to be noted that the use of the individual spring members provides a wiping surface that operates to iron or smooth out any wrinkles that may have occurred during the fabric application step in the tire building operation.

While the preceding specification has recited in detail a preferred embodiment of the invention in accordance with the requirements of the patent statutes, it is to be understood that the invention is not limited to the particular shape, configuraion or material composition illustrated. It accordingly follows that modifications of the invention may be resorted to without departing from the spirit of the invention or the scope of the appended claims.

What is claimed is:

1. A clamping device for gripping sheet material, comprising: an elongated arm having one end provided with a projecting apertured clamping arm and having a through slot provided adjacent the opposed end thereof; a second apertured clamping arm received loosely in said slot; first and second resilient members encircling said clamping arms and filling the apertures thereof, whereby relative movement between said arms and said members is prevented; first means for urging said clamping arms normally towards each other under tension; and means for moving said arms apart against the force of said first means, whereby said gripping members may be selectively moved into and out of contact with each other.

2. The device of claim 1 further characterized by the fact that an external surface of at least one of said resilient members is partially covered by a formed metallic member, a portion of which is spaced from said resilient member.

3. A clamping device for gripping sheet material comprising: a series of elongate arms arranged in a circular course about an axis of rotation with each arm having one end provided with a projecting apertured clamping arm and having a through slot provided adjacent the opposed end thereof; a second apertured clamping arm received loosely in each said slot of each said arm; an endless band encircling said first-mentioned projecting clamping arms; a second endless band encircling said remaining second-mentioned apertured clamping arms; each said band filling the aperture of each said clamping arm, whereby relative movement between said bands and said arms is prevented; said bands normally urging said first and second series of clamping arms towards each other; and means for moving one series of clamping arms away from the remaining clamping arms against the contracting force of said bands.

4. The device of claim 3 further characterized by the fact that an external surface of at least one said endless band is partially covered by a formed metallic member, a portion of which is spaced from said endless band.

References Cited in the file of this patent

UNITED STATES PATENTS

| | | |
|---|---|---|
| 1,399,261 | Johansen | Dec. 6, 1921 |
| 2,296,162 | Hanson et al. | Sept. 15, 1942 |
| 2,313,035 | Breth | Mar. 9, 1943 |
| 2,443,551 | Beam | June 15, 1948 |
| 2,488,863 | Haase | Nov. 22, 1949 |
| 2,503,815 | Frohlich | Apr. 11, 1950 |
| 2,567,641 | Hazelton | Sept. 11, 1951 |
| 2,724,424 | Clayton et al. | Nov. 22, 1955 |
| 2,778,259 | Moir | Jan. 22, 1957 |